US012588002B2

(12) United States Patent
Dong et al.

(10) Patent No.: US 12,588,002 B2
(45) Date of Patent: Mar. 24, 2026

(54) PAGING CONFIGURATION AND POWER SAVING FOR INACTIVE OR IDLE WIRELESS MOBILE TERMINALS

(71) Applicant: ZTE Corporation, Shenzhen (CN)

(72) Inventors: Fei Dong, Shenzhen (CN); He Huang, Shenzhen (CN); Yuan Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 355 days.

(21) Appl. No.: 18/541,781

(22) Filed: Dec. 15, 2023

(65) Prior Publication Data

US 2024/0121755 A1 Apr. 11, 2024

Related U.S. Application Data

(63) Continuation of application No. PCT/CN2021/125327, filed on Oct. 21, 2021.

(51) Int. Cl.
| | |
|---|---|
| *H04W 68/02* | (2009.01) |
| *H04W 52/02* | (2009.01) |
| *H04W 72/1273* | (2023.01) |
| *H04W 72/232* | (2023.01) |

(52) U.S. Cl.
CPC ....... *H04W 68/02* (2013.01); *H04W 52/0235* (2013.01); *H04W 72/1273* (2013.01); *H04W 72/232* (2023.01)

(58) Field of Classification Search
CPC ............... H04W 68/02; H04W 72/232; H04W 52/0235; H04W 72/1273
See application file for complete search history.

(56) References Cited

U.S. PATENT DOCUMENTS

| | | | | |
|---|---|---|---|---|
| 2023/0007622 A1* | 1/2023 | He | ......................... | H04W 68/10 |
| 2023/0113113 A1* | 4/2023 | He | ......................... | H04W 68/02 |
| | | | | 455/458 |

FOREIGN PATENT DOCUMENTS

CN 113170413 A 7/2021

OTHER PUBLICATIONS

Japanese-language Office Action for corresponding JP Application No. 2023-577902, dated Jan. 8, 2025, with English translation (7 pages).
Vivo; "Sub-grouping procedure for paging enhancement" [online], 3GPP TSG-RAN WG2 Meeting #115e, R2-2107407, dated Aug. 16-27, 2021. Internet URL:https://www.3gpp.org/ftp/tsg_ran/WG2_RL2/TSGR2_115-e/Docs/R2-2107407.zip (8 pages).

(Continued)

*Primary Examiner* — Justin Y Lee
(74) *Attorney, Agent, or Firm* — Crowell & Moring LLP

(57) ABSTRACT

Methods and device for paging configuration and power saving in wireless terminal devices are disclosed. The disclosed method may be performed by a wireless terminal device. The method may include receiving paging subgroup configuration information from a wireless network; determining a paging subgroup identifier based on the paging subgroup configuration information and a paging subgroup mode of the wireless terminal device; and determining whether to wake up to monitor a paging occasion based on whether the paging subgroup identifier is indicated prior to an arrival of the paging occasion.

20 Claims, 10 Drawing Sheets

(56)        References Cited

OTHER PUBLICATIONS

Media Tek Inc.; "UE Paging Subgroup Assignment for Power Saving", 3GPP TSG-RAN WG2 Meeting #114, R2-2105293, dated May 19-27, 2021. Internet URL:https://www.3gpp.org.ftp/tsg_ran/WG2_RL2/TSGR2_114-e/Docs/R2-2105293.zip (6 pages).

European Search Report for Application No. 21960971.6 dated May 15, 2024 (13 pages).

CATT, "Paging Enhancement for UE Power Saving", 3GPP TSG RAN WG1 #106-e, R1-2106983, Aug. 7, 2021 (36 pages).

Nokia, Nokia Shanghai Bell, "CN and RAN Responsibility Splitting for Paging Subgrouping", 3GPP TSG RAN WG2 #115-e, R2-2108592, Aug. 6, 2021 (5 pages).

Media Tek Inc., "Paging Enhancement with UE Grouping", 3GPP TSG RAN WG2 #113bis-e, R2-2103258, Apr. 2, 2021 (3 pages).

Lenovo, Motorola Mobility, "Consideration on the Configuration for UE Paging Grouping", 3GPP TSG RAN WG2 #115-e, R2-2107903, Aug. 6, 2021 (3 pages).

CATT; "Further Consideration on Paging Subgroup"; 3GPP TSG-RAN WG2 Meeting #115 electronic R2-2108686; Aug. 6, 2021; 3 pages.

Huawei et al.; "38.300 running CR for introduction of UE power saving enhancements"; 3GPP TSG-RAN WG2 Meeting #115 Electronic. R2-2108927; Sep. 10, 2021; 9 pages.

Mediatek Inc.; "UE Paging Subgroup Assignment"; 3GPP TSG-RAN WG2 Meeting #115 electronic; R2-2108590; Aug. 16-27, 2021; 4 pages.

International Search Report mailed Jul. 11, 2022 for International Application No. PCT/CN2021/125327.

Written Opinion mailed Jul. 11, 2022 for International Application No. PCT/CN2021/125327.

* cited by examiner

PAGING CONFIGURATION AND POWER SAVING FOR INACTIVE OR IDLE WIRELESS MOBILE TERMINALS

CROSS REFERENCE

This application is a continuation of and claims priority to International Patent Application No. PCT/CN2021/125327, filed on Oct. 21, 2021, which is herein incorporated by reference in its entirety.

TECHNICAL FIELD

This disclosure is directed generally to wireless communication network technologies and particularly to paging configuration and power saving in wireless terminal devices.

BACKGROUND

In a wireless communication system, a paging mechanism may be employed to initiate an active communication between a wireless access network node and a wireless terminal device that is otherwise in an idle state. The frequency in which a wireless terminal device wakes up from its idle state to check for paging information directly impacts power consumption and battery drain of the terminal device. It is thus desirable to reduce a rate of false paging alarm situations where the wireless terminal device wakes up to monitor a paging information but only to find out that it is not targeted.

SUMMARY

This disclosure relates to paging configuration and power saving in wireless terminal devices.

In one embodiment, a method performed by a wireless terminal device is disclosed. The method may include receiving paging subgroup configuration information from a wireless network; determining a paging subgroup identifier based on the paging subgroup configuration information and a paging subgroup mode of the wireless terminal device; and determining whether to wake up to monitor a paging occasion based on whether the paging subgroup identifier is indicated prior to an arrival of the paging occasion.

In another embodiment, a method performed by a wireless access network node to page a wireless terminal device is disclosed. The method includes determining a paging occasion associated with the wireless terminal device when the wireless terminal is to be paged; determining a paging subgroup identifier of the wireless terminal device within one of two congruent but separate divisions of a two-division paging subgroup identifier space. The method may further include transmitting a signaling message prior to the paging occasion to: indicate to the wireless terminal device that the paging subgroup identifier is activated among other paging subgroup identifiers and cause the wireless terminal device to wake up to monitor the paging occasion.

In another embodiment, a wireless terminal device or access network node comprising a processor and a memory is disclosed. The processor may be configured to read computer code from the memory to implement any of the methods above.

In yet another embodiment, a computer program product comprising a non-transitory computer-readable program medium with computer code stored thereupon is disclosed.

The computer code, when executed by a processor, may cause the processor to implement any one of the methods above.

The above embodiments and other aspects and alternatives of their implementations are described in greater detail in the drawings, the descriptions, and the claims below.

DETAILED DESCRIPTION

The technology and examples of implementations and/or embodiments described in this disclosure can be used to reduce power consumption of wireless terminal devices utilizing paging services from a wireless network. The term "exemplary" is used to mean "an example of" and unless otherwise stated, does not imply an ideal or preferred example, implementation, or embodiment. Section headers are used in the present disclosure to facilitate understanding of the disclosed implementations and are not intended to limit the disclosed technology in each of the sections only to the corresponding section. The disclosed implementations may be further embodied in a variety of different forms and, therefore, the scope of this disclosure or claimed subject matter is intended to be construed as not being limited to any of the embodiments set forth below. The various implementations may be embodied as methods, devices, components, systems, products, or non-transitory computer readable media. Accordingly, embodiments of this disclosure may, for example, take the form of hardware, software, firmware or any combination thereof.

This disclosure is directed to methods, systems, and devices related to wireless access networks, and more specifically, to implementations that facilitate reduction of power consumption in wireless terminal devices that receives services form a wireless network when being paged. While this disclosure provides example implementations in some particular generations of cellular network system, the underlying principles are applicable to other generations of cellular network systems and other general non-cellular wireless network systems.

Wireless Network Overview

Figure 1:
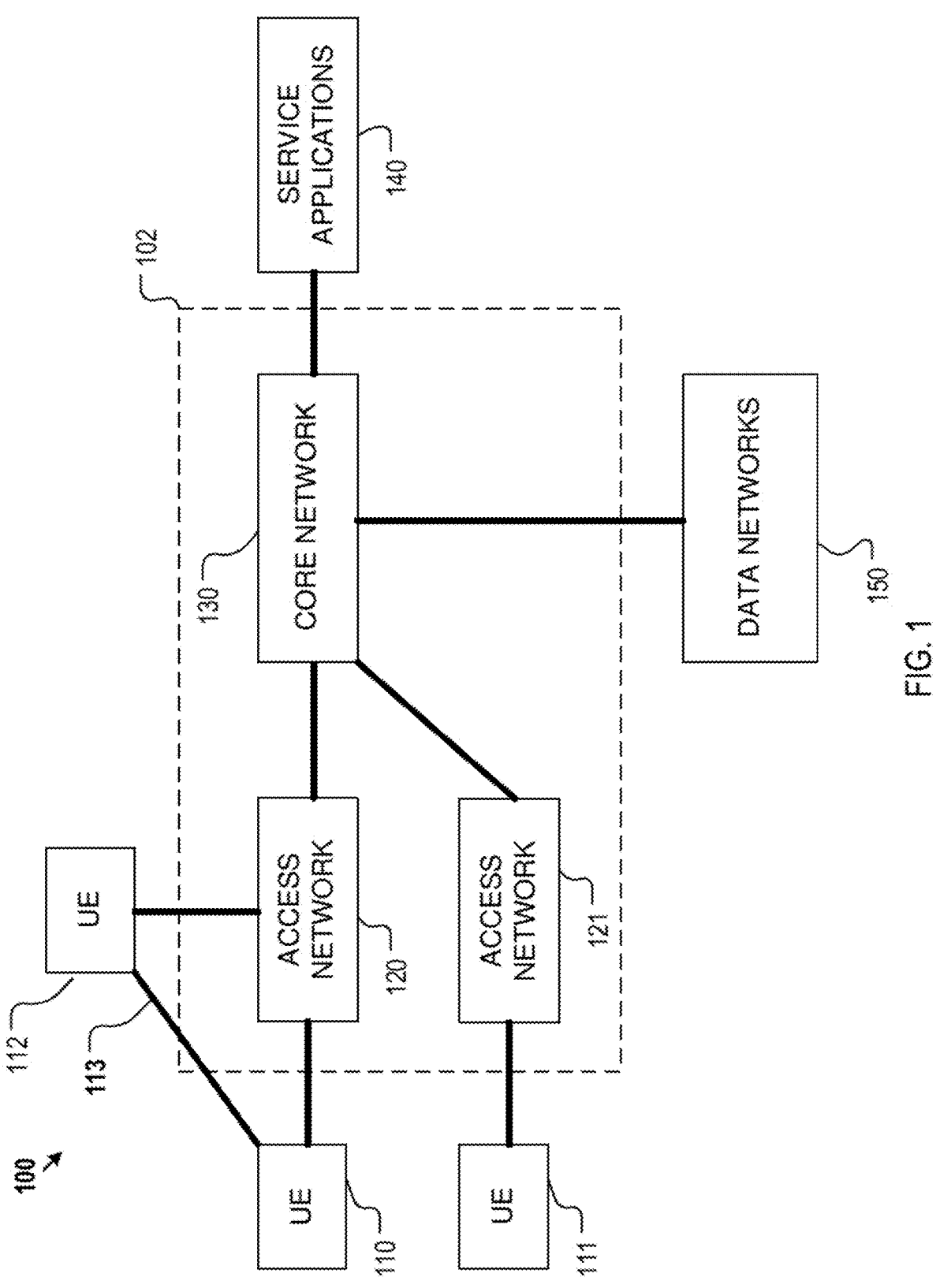
FIG. 1 illustrates an example wireless communication network comprising a wireless access network, a core network, and data networks.

An example wireless communication network, shown as 100 in FIG. 1, may include wireless terminals or user equipment (UE) 110, 111, and 112, a carrier network 102, various service applications 140, and other data networks 150. The carrier network 102, for example, may include access networks 120 and 121, and a core network 130. The carrier network 110 may be configured to transmit voice, data, and other information (collectively referred to as data traffic) among UEs 110, 111, and 112, between the UEs and the service applications 140, or between the UEs and the other data networks 150. The Access networks 120 and 121 may be configured as various wireless access network nodes (WANNs, alternatively referred to as base stations) to interact with the UEs on one side of a communication session and the core network 130 on the other. The core network 130 may include various network nodes configured to control communication sessions and perform network access management and traffic routing. The service applications 140 may be hosted by various application servers deployed outside of but connected to the core network 130. Likewise, the other data networks 150 may also be connected to the core network 130.

In the wireless communication network 100 of FIG. 1, the UEs may communicate with one another via the wireless access network. For example, UE 110 and 112 may be connected to and communicate via the same access network 120. The UEs may communicate with one another via both the access networks and the core network. For example, UE 110 may be connected to the access network 120 whereas UE 111 may be connected to the access network 121, and as such, the UE 110 and UE 111 may communicate to one another via the access network 120 and 121, and the core network 130. The UEs may further communicate with the service applications 140 and the data networks 150 via the core network 130. Further, the UEs may communicate to one another directly via side link communications, as shown by 113.

Figure 2:
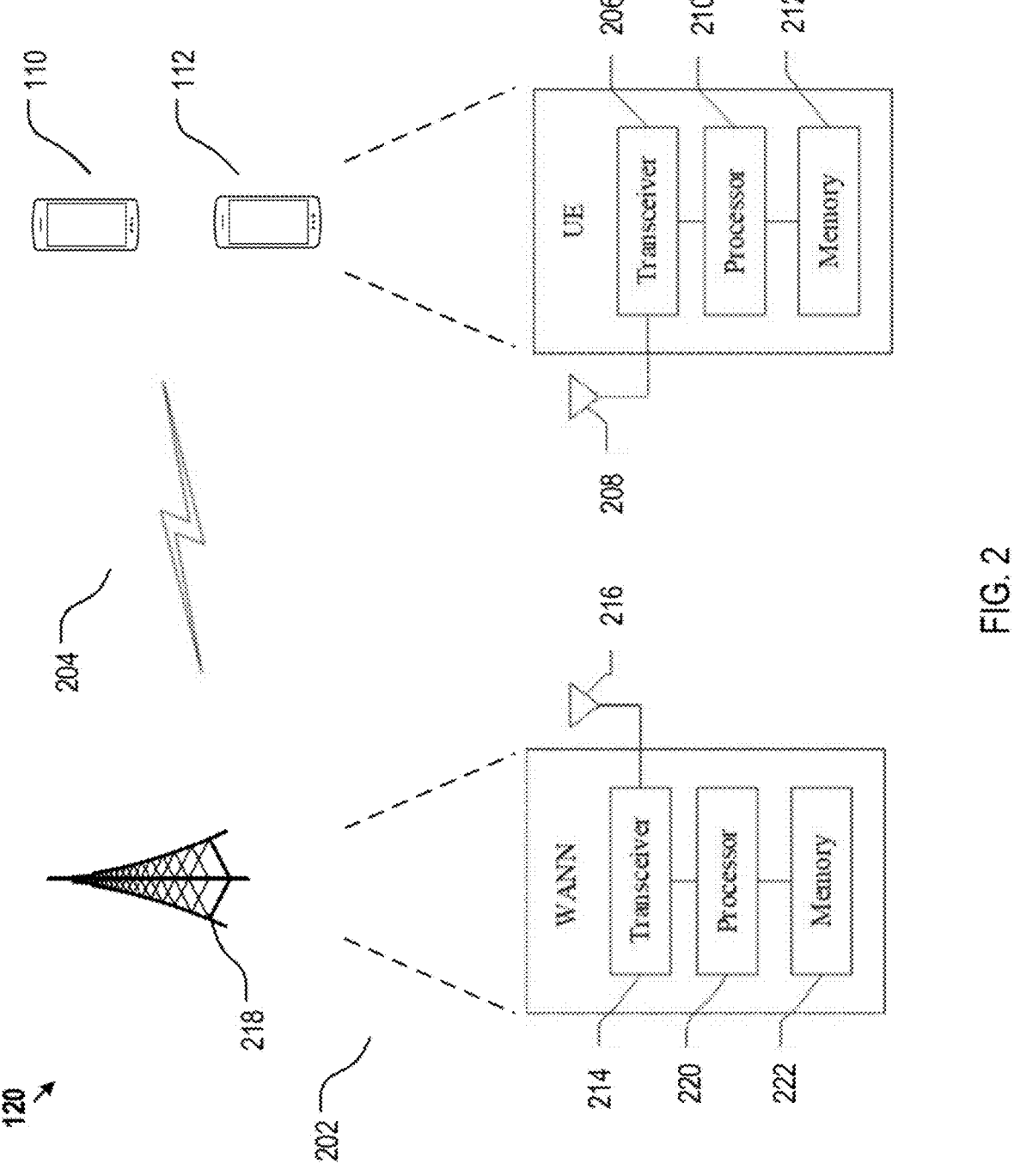
FIG. 2 illustrates and example wireless access network including a plurality of wireless terminals and a wireless access network node in communication with one another via an over-the-air communication interface.

FIG. 2 further shows an example system diagram of the wireless access network 120 including a WANN 202 serving UEs 110 and 112 via the over-the-air interface 204. Each of the UEs 110 and 112 may be a mobile or fixed terminal device installed with mobile access units such as SIM/USIM modules for accessing the wireless communication network 100. The UEs 110 and 112 may be implemented as a terminal device including but not limited to a mobile phone, a smartphone, a tablet, a laptop computer, a vehicle on-board communication equipment, a roadside communication equipment, a sensor device, a smart appliance (such as a television, a refrigerator, and an oven), or other devices that are capable of communicating wirelessly over a network. For some of these devices, particularly those operated on battery, it may be critical to keep their power consumption low. As shown in FIG. 2, each of the UEs such as UE 112 may include transceiver circuitry 206 coupled to one or more antennas 208 to effectuate wireless communication with the WANN 120 or with another UE such as UE 110. The transceiver circuitry 206 may also be coupled to a processor 210, which may also be coupled to a memory 212 or other storage devices. The memory 212 may be transitory or non-transitory and may store therein computer instructions or code which, when read and executed by the processor 210, cause the processor 210 to implement various ones of the methods described herein.

Similarly, the WANN 120 may include a base station or other wireless network access point capable of communicating wirelessly via the over-the-air interface 204 with one or more UEs and communicating with the core network 130. For example, the WANN 120 may be implemented, without being limited, in the form of a 2G base station, a 3G nodeB, an LTE eNB, a 4G LTE base station, a 5G NR base station, a 5G central-unit base station, or a 5G distributed-unit base station. Each type of these WANNs may be configured to perform a corresponding set of wireless network functions. The WANN 202 may include transceiver circuitry 214 coupled to one or more antennas 216, which may include an antenna tower 218 in various forms, to effectuate wireless communications with the UEs 110 and 112. The transceiver circuitry 214 may be coupled to one or more processors 220, which may further be coupled to a memory 222 or other storage devices. The memory 222 may be transitory or non-transitory and may store therein instructions or code that, when read and executed by the processor 220, cause the processor 220 to implement various functions of the WANN 120 described herein.

Figure 3:
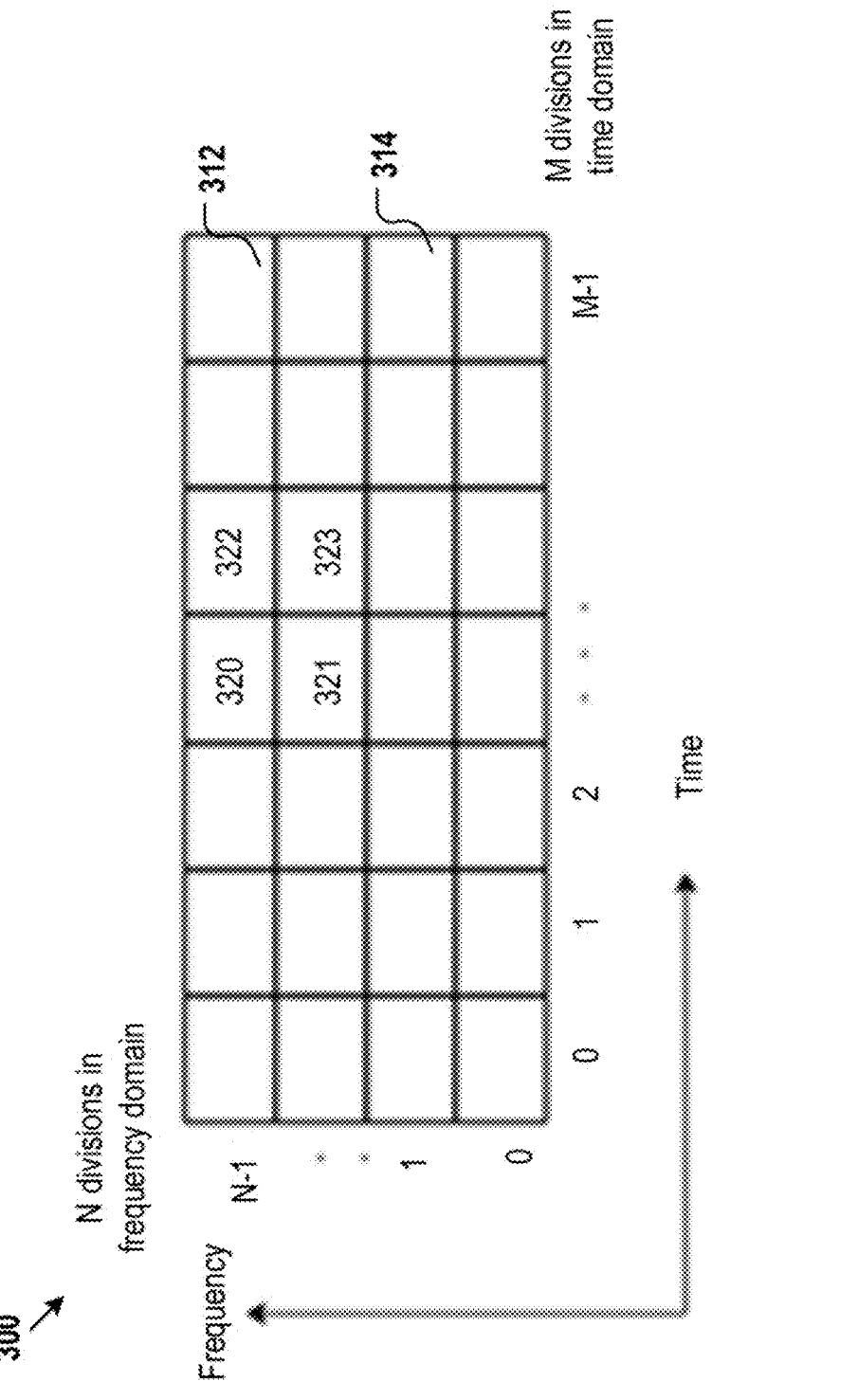
FIG. 3 illustrates an example wireless communication resource grid in both time domain and frequency domain.

The wireless transmission resources for the over-the-air interface 204 include frequency, time, and spatial resource. For example, the available frequency and time resource available for wireless communication (alternatively referred to as wireless resource, or wireless transmission resource) is illustrated as 300 in FIG. 3. The transmission resource 300 includes time domain resource and frequency domain resource that may be allocated to carry downlink (DL) or uplink (UL) data or control information. The transmission resource 300 may be further divided into multiple divisions to support more flexible transmission resource scheduling, configuration, and allocation. For example, in the time domain, the transmission resource 300 may be divided into M divisions, and in the frequency domain, the transmission resource 300 may be divided into N divisions. As such, the transmission resource 300 may be considered as a resource grid including M*N resource divisions. M and N are both positive integers. In FIGS. 3, 312 and 314 are shown as two example division. Organization of the transmission resource 300 into resource divisions of FIG. 3 facilitates more efficient resource allocation, configuration, and utilization.

The division of time and frequency of wireless resource 300 may be made at various hierarchical levels. FIG. 3 merely shows an example division at a particular level. The configuration and identification of the time and frequency resource may be made at any level. For example, the wireless resource 300 may be divided into resource blocks (RBs), representing the smallest unit of wireless resource allocable to a UE to communicate with a WANN. Each RB may be further divided into sub-units in both time and frequency that are separately identifiable and configurable. For example, in the frequency domain, an RB may be divided into a configurable number of subcarriers having a configurable subcarrier spacing. In the time domain, an RB may occupy a time slot with a configurable time length that may be further divided into a number of time units each corresponding to, for example, a symbol in orthogonal frequency division multiplexing (OFDM) or other modulation schemes. Each unit containing a subcarrier in the frequency domain and a symbol in the time domain may be referred to as a resource element (RE), representing the smallest unit of the wireless resource 300 that is identifiable and configurable. The wireless resource 300 may be allocated and configured in higher levels. For example, in the time domain, a sub-frame may include a predetermined number (e.g., 7) of time slots, a frame may include a predetermined number (e.g., 2) of sub-frames. For another example, blocks of subcarriers in a number of RBs in the frequency domain may be organized as various frequency channels, each allocated for different purposes in transmitting data and control information. These frequency channels may include but are not limited to uplink frequency channels (such as physical uplink shared channels (PUSCHs), physical uplink control channels (PUCCHs), and the like) and downlink frequency channels (such as physical downlink shared channels (PDSCHs), physical uplink control channels (PDCCHs), and the like). While the term "frequency channel" is used to refer to the collection of subcarriers in a particular frequency range, the term "channel" by itself may be used to refer to the broader concept of resource units not limited to the frequency domain.

While the description above focuses on time and frequency resource 300, it may be combined with spatial multiplexing based on utilizing multiple antennas and beam forming in wireless transmission. The allocation and configuration of such spatial resources may be part of the overall wireless resource allocation and configuration. The principles underlying the various implementations included in this disclosure are intended to be applicable to wireless resource allocation and configuration including all of time, frequency, and space dimensions. The wireless resource descried above may be configured or allocated for various paging functions as described below.

Power Saving for UE in Idle State and Paging Mechanism

In the wireless communication system 100 of FIG. 1 and other wireless communication systems, a UE may operate in either an active or idle (or inactive, or sleep) state (or mode). The UE is in an active mode when there is an active communication session between the UE and the access network. Otherwise, the UE may be in an idle or inactive state. When the UE is idle, it may turn off most of its operations to reduce power consumption and to minimize battery drain. The UE, however, may continue to perform limited functions such as waking up at times (either preconfigured or by signaling) to monitor whether it needs to enter any active communication session. If so, the UE transitions into active state. Otherwise, the UE falls back to the idle state and wait for a next time to wake up to monitor again. In various generations of cellular wireless network, a UE may be in a Radio Resource Control (RRC) active state or RRC idle state.

For example, the carrier network 102 of FIG. 1 may utilize a paging mechanism to alert a particular UE 110 of FIG. 1 using the access network via the over-the-air interface when communications to or from that particular UE is needed or solicitated (e.g., when communications with the UE 110 are requested by other UEs such as 112, by any other components of the carrier network 102, or by the data network 150 or service application 140). In some implementations of a paging mechanism, a wireless access network node may be configured to broadcast paging configuration information at preconfigured or dynamically configured frequency and time resources. The UEs in the tracking area of the wireless access network node or otherwise registered with the wireless access network node may be correspondingly configured to wake up to monitor these frequency and time resources when they are in the idle state. The paging configuration information, for example, may contain an identification of one or more subsequent network resources allocated for carry paging information. The UEs may then receive the paging information at the network resources identified in the paging configuration information.

Figure 4:
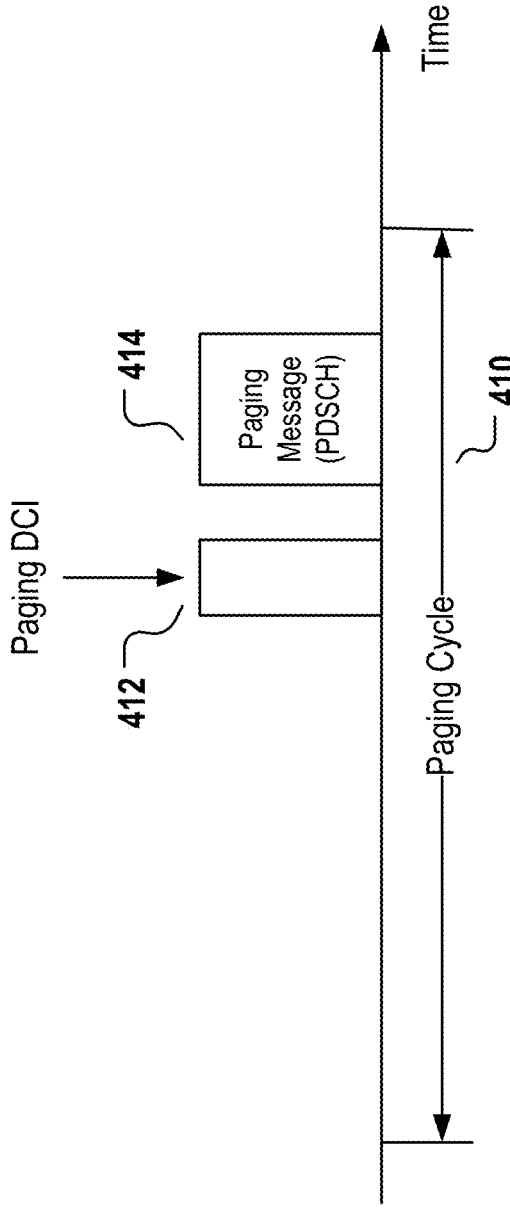
FIG. 4 illustrates an example paging cycle including an example paging occasion and a paging message.

Some specific implementations of the example paging mechanism above may be based on Discontinuous Reception (DRX). In DRX, monitoring of paging configuration information and corresponding paging information by the UEs may be managed in cycles, referred to as DRX cycles, or paging cycles. The paging configuration information may be carried in paging Downlink Control Information (DCI) message. The paging information identified by the paging configuration information may be contained in a paging message. FIG. 4 illustrates an exemplary implementation of a paging cycle 410. In each paging cycle, a UE within the tracking area of the wireless access network node in the idle or inactive state may wake up to monitor the paging DCI 412 at a particular time indicated in FIG. 4. The paging DCI may therefore be alternatively referred to as a paging occasion (PO). As an example, the paging DCI 412 may be transmitted on a physical downlink control channel (PDCCH). In some particular implementations, the format of the paging DCI 412 may include a DCI format 1_0.

After waking up to monitor and receive the paging DCI 412, the UE may further receive the paging message 414 according to the network resource configuration and scheduling information contained in the paging DCI 412. The paging message 414, for example, may be carried on a physical downlink shared channel (PDSCH). The paging message may target a particular UE. An identification of the particular target UE may be included in the paging message. An example of such identification of the target UE in a $5^{th}$ generation wireless cellular network may be implemented as a $5^{th}$ Generation System Temporary Mobile Subscription Identifier (5G-S-TMSI). The UE may process the received paging message 414 and determine whether it is targeted by the paging message 414 by determining whether the identifier of the target UE specified in the paging message 414 matches its own network ID. If so, it further processes the paging message and respond to the paging message. Otherwise it falls back to sleep state and wait for waking up again at its next PO (or paging DCI).

Figure 5:
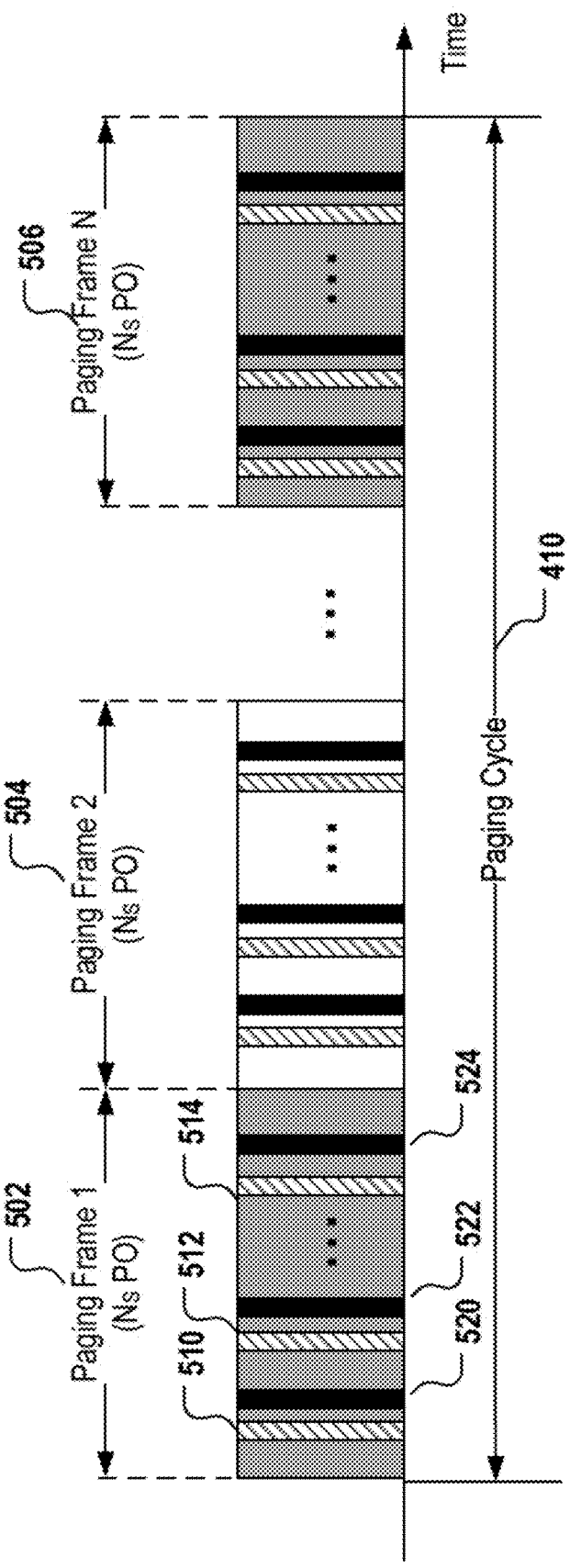
FIG. 5 illustrates an example arrangement of paging frames, paging occasions, and paging messages in a paging cycle.

There may be multiple paging requests targeting various UEs during a paging cycle 410. In accommodation, and as shown in FIG. 5, the paging cycle 410 may be further divided into multiple paging frames (N, representing the configured number of paging frames per paging cycle) as shown by 502, 504, and 506 of FIG. 5. Each paging frame may be configured with multiple POs ($N_S$, representing the configured number of paging occasions or paging DCIs per paging frame), as shown by 510, 512, and 514 for paging frame 502 of FIG. 5. Each paging frame may correspondingly include $N_S$ or other numbers of paging messages as configured by the paging DCIs as shown by 520, 522, and 524 for paging frame 502 in FIG. 5.

With the paging configuration of FIG. 4 or FIG. 5, if a UE is configured to monitor every PO and then identify and process the corresponding paging message, it may be likely that the UE would wake up and only to find out that the paging message targets some other UEs. Such POs constitutes false alarms for the UE and would result in a significant amount of unnecessary power consumption and battery drain for the UE. To reduce power consumption, in some implementations, the potential UEs within the tracking area of the wireless access network node may be divided into groups and each group may be associated with a subset of the POs. As such, a number of UEs may be configured to form a group to monitor a particular PO of a particular paging frame in a paging cycle. Other UEs not belonging to this group would sleep through this particular PO to save power. Likewise, another group of UE may be configured to only wake up to monitor another particular PO of the paging frame of the paging cycle, and the rest of the UEs may be configured to sleep through this PO of the paging frame. In Other words, each PO in a paging frame may be associated with a group of potential UEs. In such implementations, a UE only needs to wake up at POs associated with the UE groups to which it belongs and sleeps through other POs.

In some further implementations, each group of UEs that are configured to monitor a same PO may be divided into subgroups to further facilitate power saving. For example, once the UEs are divided into subgroups, the network may, prior to transmitting the PO corresponding to the UE group, additionally transmit an signaling message to indicate subgroup(s) to which the paged UE(s) in the PO belongs. The monitoring of such signaling message may only require minimal functional support at the UEs (e.g., the UEs in the UE group need not to fully wake up to monitor the signaling message). As such, only the subgroups of UEs within the UE group associated with the PO that are implicated by the signaling message need to wake up to receive the PO and paging message, thereby further reducing power consumption for the UEs outside the implicated (or activated) subgroup.

Subgrouping of UEs for Power Saving

Various manners in which a UE paging group may be divided into subgroups for paging purposes are described in more detail below. In some implementations, the UEs may be sub-grouped based on their network identifiers, referred to as UE IDs in the disclosure herein. For example, in a UE ID-based subgrouping, a subgroup identifier for a UE paging subgroup with a UE paging group that a particular UE belongs to may be calculated based on, for example, the 5G-S-TMSI of the UE. One of any various predetermined optional algorithms known to both the wireless access network node and the UEs may be selected for use in uniquely converting a UE identifier into a paging subgroup identifier.

In some other implementations, subgrouping of the UEs may be determined by the core network (CN) 130 of FIG. 1. For example, subgroup identifier of a UE may be assigned by the core network, e.g., by an Access Management Function (AMF) network node in a $5^{th}$ generation cellular wireless network. Such UE paging subgrouping by the CN, may be referred to as CN-based UE subgrouping and may be based on, for example, paging probability, power profile, and/or other characteristics of the UEs. For either type of paging subgrouping determination manners above, each subgroup identifier may represent a subgroup of UEs with a UE paging group.

In some implementations, each RAN (or the wireless access network node therein) may be responsible for determining a maximum number of UE ID based paging subgroups (based on, e.g., the capability of the RAN), represented by $N_{sg}$, while the CN may be responsible for determining a maximum number of UE paging subgroups that are assigned by the CN, represented by $N_{CN}$.

In general, the UE ID-based UE subgrouping may be considered somewhat random since the UE IDs generally may not carry much information with respect to UE paging probability. On the other hand, the CN-based UE subgrouping may be more based on UE characteristics such as paging probability. As such, the CN-based UE subgrouping may carry the advantage of subgrouping similar UEs together in terms of network characteristics relevant to paging such as paging probability.

In some implementations, both UE ID-based UE subgrouping and CN-based UE subgrouping may be supported for a RAN. In such implementations, a total number of UE ID-based UE subgroups and CN-based UE subgroups may be limited to a maximum number of UE subgroups with a UE group, represented by $N_{max}$. In some implementations, some UEs may only support UE ID-based subgrouping or may not be assigned with a subgroup ID by the CN, whereas other UEs may be capable of accepting subgroup assignment from the CN in addition or alternative to supporting UE ID-based subgrouping.

In implementations of UE paging subgrouping based on both UE-ID and CN assignment, it is likely that the CN may assign some UEs to a paging subgroup that may also contain some other UEs that happen to fall within the subgroup because of their UE-IDs for one RAN. A UE subgroup corresponding to a particular UE subgroup identifier may consequently contain both CN-assigned UEs and UEs of random UE-IDs. In other words, while the CN assignment of UE into a particular subgroup may aim at having similar UEs in the particular subgroup (in terms of, for example, UE paging probability), the actual UE subgroup may end up with UEs having drastically different paging probabilities. In such implementations, the UEs having lower paging probabilities in a paging subgroup having mixed paging probabilities would suffer higher false alarm ratio and undesired power consumption and battery drain.

In addition, because the core network may manage RAN with distinct capabilities and UEs may frequently move between tracking areas of various RANs, it is likely that the CN may need to perform an overall UE subgroup assignment for UEs that support CN-based subgrouping. The number of UE subgroups that can be assigned by the CN thus may be larger than the maximum number of UE paging subgroups that can be supported by and as determined by some particular RAN having lower capabilities.

The various further implementations described below for paging subgroup identifier determination for either or both of UE-ID based subgrouping and/or CN-based subgrouping are designed to provide schemes that attribute similar UEs (in terms of, for example, paging probability) with unique paging subgroup identification. Such paging subgroup identification may be implemented in either a single-level or multi-level grouping scheme. The disclosed schemes result in higher likelihood that UEs having similar paging characteristics as determined by the CN are sub-grouped together under particular subgroup identification and without other UEs with random characteristics, thereby reducing power consumption and battery drain and avoiding unnecessary PO monitoring and paging message processing for at least some UEs.

Figure 6:
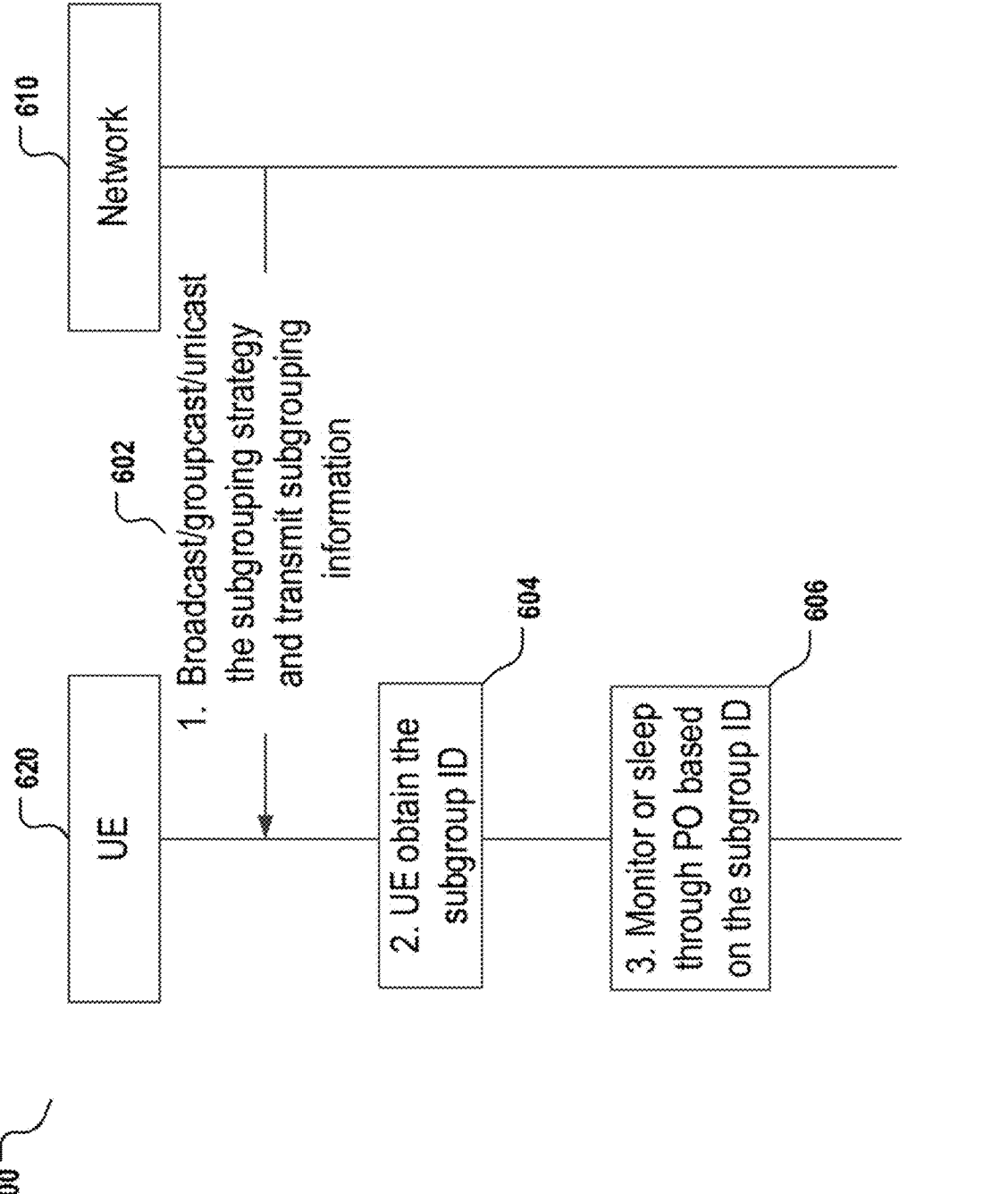
FIG. 6 illustrates an example logic flow for paging group configuration and paging procedure.

FIG. 6 shows and example general logic flow 600 for realizing the various paging subgrouping mechanisms described in this disclosure. As shown by 602 in FIG. 6, the network side 610 may first broadcast, group-cast, or unicast paging subgrouping strategy and transmitting other supplemental information data items for the UE 620 to determine its paging subgroup ID, which may either be a single-level subgroup ID or multi-level subgroup ID. Such information may include other paging information such as paging group information, paging cycle information, paging frame information, and PO configuration information, and any other information that may be used by the UE to perform subgrouping determination. Such information may be transmitted from the wireless network, e.g., via a wireless access network node of a serving cell for the UE, as a single control message, or a collection of messages. These messages may be of a single signaling type or mixed types, may be transmitted via a single or mixed control or data channels, and may be one of or any combination of broadcast, groupcast, or unicast messages. Such information may be collectively referred to as paging subgroup configuration information. Such information items may be received by the UE and used to obtain its paging subgroup ID in step 604. The paging subgroup ID may be associated with a PO during of a paging frame (together with other subgroup IDs for the same PO). During an RRC idle/inactive mode, the UE may then wake up or to monitor or sleep through the PO according to its paging subgroup ID, as shown by step 606. The specific example procedure for the UE to wake up to monitor the PO or sleep through the PO may include following:

Step (a): The UE may manage to receive a message before the PO to check the paging subgroup information or indication carried in this message. Go to step (b).

Step (b): If the subgroup information or indication carried in the message matches the subgroup ID obtained in step 2 of FIG. 6, go to step (c), otherwise, go to step (d).

Step (c): the UE wake up to monitor the PO.

Step (d): UE does not wake up to monitor the PO (or sleep through the PO).

The message used in Step (a) may be implemented as various types of control message. For example, it may be implemented as a DCI message. Such a DCI message may carry information about the paging subgroups within a paging group that may need to wake up to receive a corresponding PO. Such information, for example, may be included as:

A bitmap, with each bit representing one paging subgroup or paging subgroup set (see paging subgroup set of the two-level subgrouping examples in the description below). If a bit is set to 1 (or 0), it means that the paging information to follow is for the subgroup or subgroup set it represents.

Alternatively, a code point. For example, the code 0000 0000 may represent a subgroup or subgroup set with ID=0, whereas the code 0000 0001 may represent a subgroup or subgroup set with ID=1, and so on.

Single-Level Subgrouping

In some example implementations, a single-level subgrouping scheme may be used in which each subgroup ID contains a single identification value in a paging subgroup ID space. For example, all paging subgroups may be numbered consecutively with corresponding subgroup ID. In such a single-level subgrouping scheme, the UE ID-based paging subgroups and the CN-assigned paging subgroups may be separated rather than mixed. For example, a single-level paging subgroup ID space may be bifurcated or divided into two separate divisions, one for UE ID-based subgroups and the other for CN assigned subgroups.

In a first example, the UE ID-based subgroups may form a division of paging UE subgroups that are lower in ID number than the division formed by CN-assigned UE paging subgroups in the single-level paging subgroup ID space. In a second example, the UE ID-based subgroups may form a division of paging UE subgroups that are larger in ID number than the division formed by the CN-assigned UE paging subgroups in the single-level paging subgroup ID space. In some other examples, the two paging subgroup ID divisions may be interleaved or arranged in other predefined pattern rather than bifurcated in the single-level paging subgroup ID space, as long as they do not mix (i.e., each division may be distributed as multiple parts the paging subgroup ID space, and each part of a division do not contains subgroup IDs of both UEs that only support UE ID-based subgrouping and UEs that only support CN-assigned subgrouping).

First Example Single-Level Subgrouping

Figure 7:
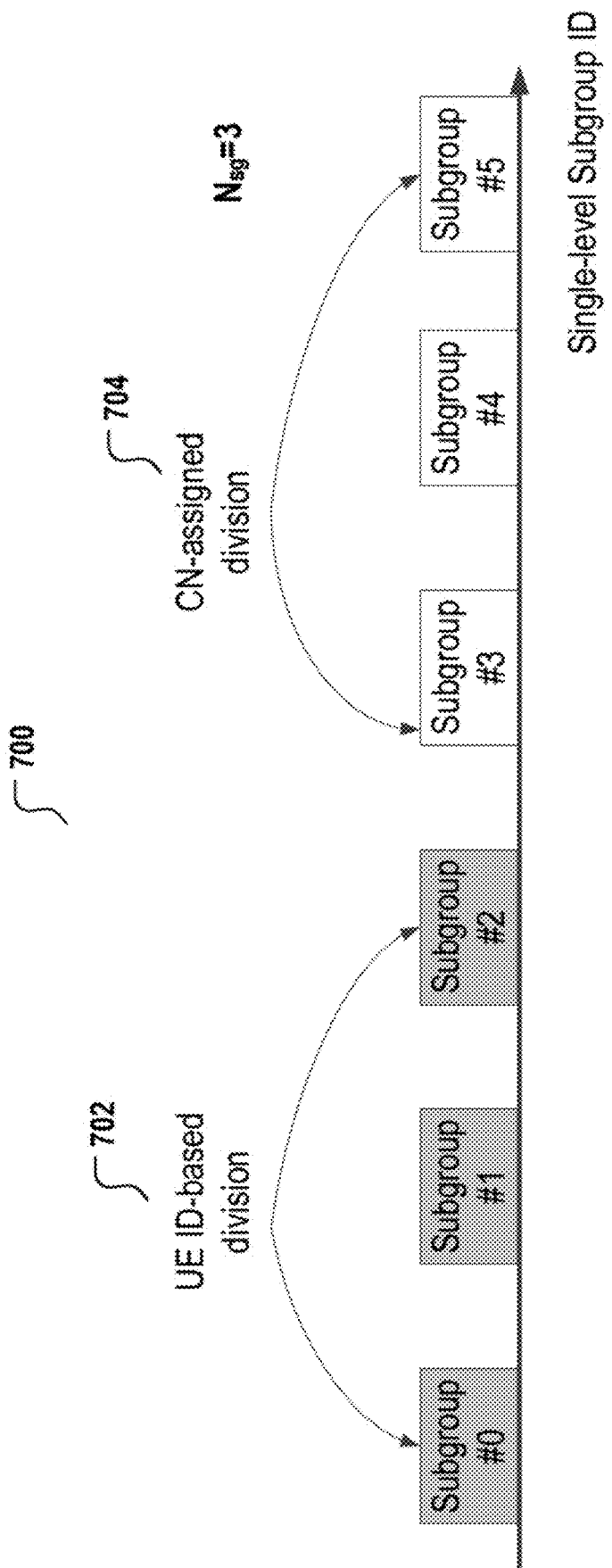
FIG. 7 illustrates an example single-level paging grouping scheme.

The first example is specifically illustrated in FIG. 7. As shown in FIG. 7, the paging UE subgroup ID space 700 is bifurcated into divisions 702 and 704. Division 702 contains UE paging subgroups with subgroup IDs that are determined based on UE IDs whereas division 704 contains UE paging subgroups that are assigned by the CN. The two division form a single-level UE paging subgroup ID space 700 that contains paging subgroup IDs that are, for example, consecutively numbered. While in the example of FIG. 7 each of the divisions are illustrated as containing three UE paging subgroups, the number of UE paging subgroups in each of the divisions in the paging subgroup ID space is not so limited and may be any other numbers.

In this first example, a UE may determine its paging subgroup ID in the following manner First, the RAN may broadcast in step 602 of FIG. 6 the total number of UE ID-based user subgroups $N_{sg}$ that is being configured and managed by the RAN (NumberofPagingGroup-UE ID). Such information may be received by all UEs. A UE that support CN-assigned subgrouping and have obtained a value of the CN-assigned subgroup offset from CN may instead shift the CN-assigned paging subgroup ID offset by $N_{sg}$ to derive its paging subgroup ID such that the derived paging subgroup ID falls within the higher CN-assigned division 704 of the paging subgroup ID space 700 of FIG. 7. For example, a UE that support CN-assigned subgrouping and have obtained a value of the CN-assigned subgroup offset from CN may derive its paging subgroup ID as:

$$\text{Paging Subgroup ID} = \text{CN-assigned Subgroup Offset} + N_{sg},$$

where, as described above, $N_{sg}$ represents the number of UE ID-based paging subgroups, which occupies, as shown by 702 of FIG. 7, the lower-value division of the UE paging subgroup ID space 700.

In some situations of this first example, if the sum of CN-assigned subgroup offset and $N_{sg}$ is greater than $N_{max}$ (in some implementation, $N_{max}$ represents the maximum number of paging subgroups supported by the RAN which may be either configurable or hard specified), a UE that supports CN-assigned subgrouping and have obtained a value of the CN-assigned subgroup offset from CN may derive its paging subgroup ID as:

$$\text{Paging Subgroup ID} = \text{Mod(CN-assigned Subgroup offset}, N_{max} - N_{sg}) + N_{sg},$$

where the mod(a, b) represents the modulo operation that returns a remainder of a/b.

Essentially, in order for the paging subgroup ID division 704 for the CN-assigned subgroups in the paging subgroup ID space 700 to not overrun the maximum total number of paging subgroups supported by the RAN after $N_{sg}$ groups are reserved in the division 702 for UE ID-based paging subgroups, this example scheme limits the number of subgroups that could be used by the UEs supporting CN-assigned subgrouping to $N_{max} - N_{sg}$. This limited number of paging subgroup IDs are cyclically reused by the CN-assigned subgroup offsets. In other words, CN-assigned offsets that differ by $N_{max} - N_{sg}$ may be given a same paging subgroup ID in the CN-assigned division 704.

Further for this first example single-level paging subgrouping mechanism, a UE that supports UE ID-based subgrouping or that is not provided with an CN-assigned paging subgroup ID offset may derive its paging subgroup ID as follows:

$$\text{Paging Subgroup ID} = \text{mod(floor(UE\_ID}/(N^*N_S)), N_{sg})$$

where:

UE_ID, as described above, represents a UE identification determined using the UE network ID such as 5G-S-

TMSI cycled through a predefined size of the UE ID space of, for example, 1024. In other words. UE_ID=mod (5G-S-TMSI, 1024).

N, as described above, represents the number of total paging frames in a paging cycle T (e.g., DRX paging cycle).

$N_S$, as described above, represents the predefined number of paging occasions (POs) in a paging frame (PF).

$N_{sg}$, as described above, represents the total number of UE ID-based paging subgroups.

Essentially, the UEs supporting UE ID-based subgrouping are divided into $N_{sg}$ paging subgroups. Subgroup IDs of these $N_{sg}$ paging subgroups occupy the lower division 702 of the single-level subgroup ID space 700 of FIG. 7. The UEs are distributed into these $N_{sg}$ subgroups interleavingly based on its UE_ID. In other words. UEs with UE_ID differ by $N*N_S$ belong to a same paging subgroup, where $N*N_S$ represents a total number of POs in a paging cycle.

Second Example Single-Level Subgrouping

Figure 8:
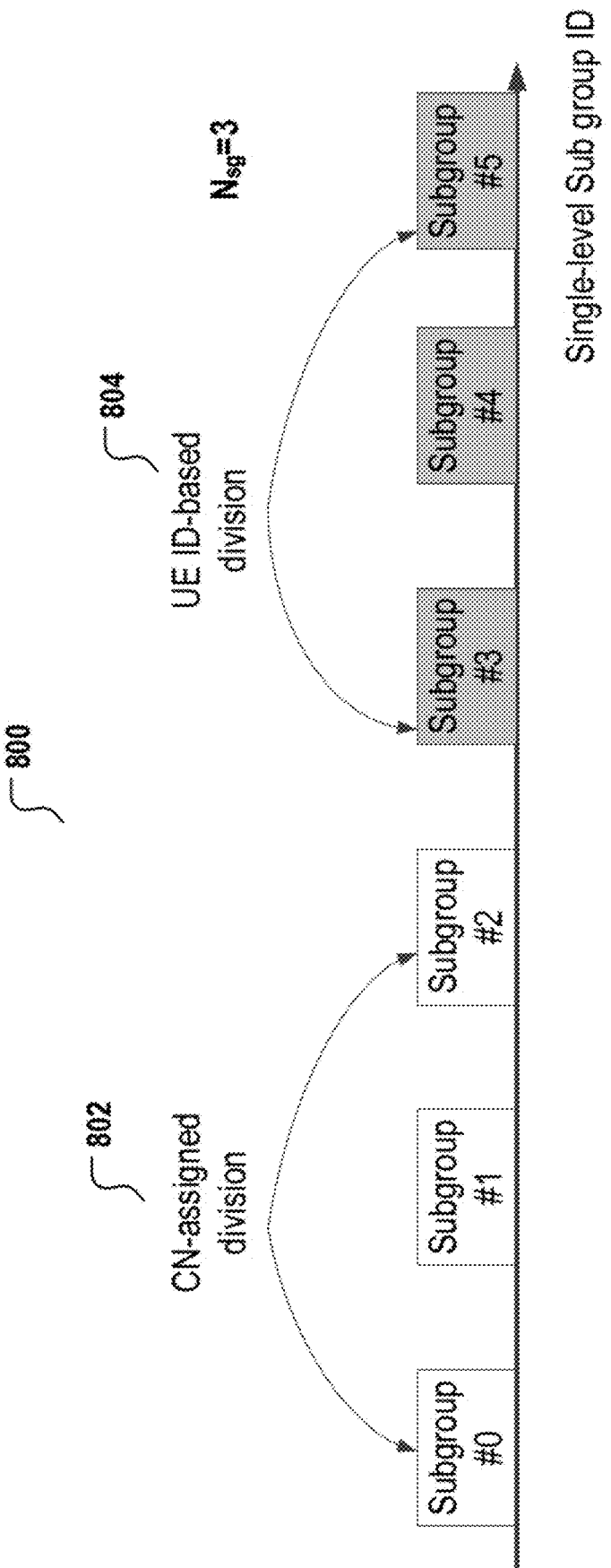
FIG. 8 illustrates another example single-level paging grouping scheme.

The second example above is specifically illustrated in FIG. 8. As shown in FIG. 8, the paging UE subgroup ID space 800 is bifurcated into divisions 802 and 804. Division 804 with higher paging subgroup IDs contains UE paging subgroups with IDs that are determined based on UE IDs whereas division 802 with lower paging subgroup IDs contains UE paging subgroups that are assigned by the CN. The two division form a single-level UE paging subgroup ID space 800 that contains paging subgroup IDs that are, for example, consecutively numbered. While in the example of FIG. 8 each of the divisions are illustrated as containing three UE paging subgroups, the number of UE paging subgroups in each of the divisions in the paging subgroup ID space is not so limited and may be any other numbers.

In this second example, a UE may determine its paging subgroup ID in the following manner First, the RAN may broadcast in step 602 of FIG. 6 the total number of UE ID-based user subgroups $N_{sg}$ that is being configured and managed by the RAN (NumberofPagingSubgroup-UE ID). Such information may be received by all UEs. A UE that supports CN-assigned subgrouping and assigned with a subgroup ID by the CN may simply use the subgroup ID assigned by the CN as its actual paging subgroup ID, as shown by 802 of FIG. 8 and below:

$$\text{Paging Subgroup ID=CN-assigned Paging Subgroup ID.}$$

In some situations of this second example, if the sum of a number of CN-assigned subgroups and $N_{sg}$ is greater than $N_{max}$ the maximum number of paging subgroups supported by the RAN, a UE that supports CN-assigned subgrouping and assigned with a subgroup ID by the CN may derive its paging group ID as:

$$\text{Paging Subgroup ID=mod(CN-assigned Subgroup ID,}N_{max}-N_{sg}).$$

Essentially, in order for the paging subgroup ID divisions 802 and 804 to not overrun the maximum total number of paging subgroups supported by the RAN after $N_{sg}$ subgroups are reserved in the division 804 for UE ID-based paging subgroups, this example scheme limits the number of subgroups that could be used by the UEs supporting CN-assigned subgrouping and have been assigned with subgroup IDs to $N_{max}-N_{sg}$. The limited number of paging subgroup IDs are cyclically reused by the CN-assigned subgroup IDs as the actual paging subgroup IDs for CN-assigned paging subgroups. In other words, CN-assigned IDs that differ by $N_{max}-N_{sg}$ may be given a same paging subgroup ID within the CN-assigned division 802 of FIG. 8.

In some variation of this example implementation, a number of CN-assigned paging subgroups, $N_{CN}$, may be predetermined and a UE that supports CN-assigned subgrouping and are assigned with subgroup IDs by the CN may correspondingly derive its actual paging subgroup ID by cyclically reusing $N_{CN}$ according to the CN-assigned subgroup IDs in a manner described by:

$$\text{Paging Subgroup ID=mod(CN-assigned Subgroup ID,}N_{CN}).$$

In this second example, a UE that supports UE ID-based subgrouping and/or that is not assigned with a paging subgroup ID by the CN may derive its actual subgroup ID according to:

$$\text{Paging Subgroup ID=mod(floor(UE\_ID/}(N*N_S)),$$
$$N_{sg})+N_{CN}$$

Essentially for this second example, the UEs supporting UE ID-based subgrouping and not assigned with a subgroup ID by CN are divided into $N_{sg}$ paging subgroups. Subgroup IDs of these $N_{sg}$ paging subgroups occupy the higher division 804 of the single-level subgroup ID space 800 of FIG. 8. These UEs are distributed into these $N_{sg}$ subgroups interleavingly based on its UE_ID. In other words. UEs with UE_ID differ by $N*N_S$ belong to a same paging subgroup, where $N*N_S$ represents a total number of POs in a paging cycle. The actual paging subgroup ID for a UE supporting UE ID-based subgrouping and not assigned with a subgroup ID by CN is further upshifted by $N_{CN}$ into the higher division 804 of the single-level paging subgroup ID space 800, as specified in the example equation above.

In the various example single-level paging subgroup grouping schemes above, CN-assigned subgroup ID offset is assigned and thus known to the CN. The UE_ID is further known to the CN. The CN may thus derive an actual paging subgroup ID for the particular UE following the similar schemes above.

The paging subgroup ID determination formula or algorithm for the various examples above are merely illustrated as examples. Other formula may be used to determine the subgroup IDs. The essential idea above is to separate the subgroup ID space into divisions or parts, each division or part is used for subgroup IDs that are based either on UE IDs or CN-assignment, but not both. The actual subgroup IDs for the UEs need not be the direct values of any of the formula above or other deterministic formula. For example, additional mapping may be used to convert values calculated from a particular formula above or other formulae to actual subgroup designations.

Multilevel Subgrouping

In some other example implementations, a multilevel subgrouping scheme may be designed in which a subgroup ID data structure is used to specify paging subgroups. Each group ID data structure may contain one or more of multiple types of paging subgroup identification data items that jointly specify a paging subgroup. Particularly, a two-level subgroup ID data structure may contain one or more of two subgroup ID identification data items that jointly and uniquely specifies a paging subgroup. The first identification data item may be referred to as subgroup set ID (for identifying sets of paging subgroups) whereas the second identification data item may be referred to as subgroup ID (which represents an identification within a subgroup set). An actual two-level subgroup ID data structure may include one of the two identification data items or both of the two identification data items, as described in further detail in the examples below.

First Example Two-Level Subgrouping

Figure 9:
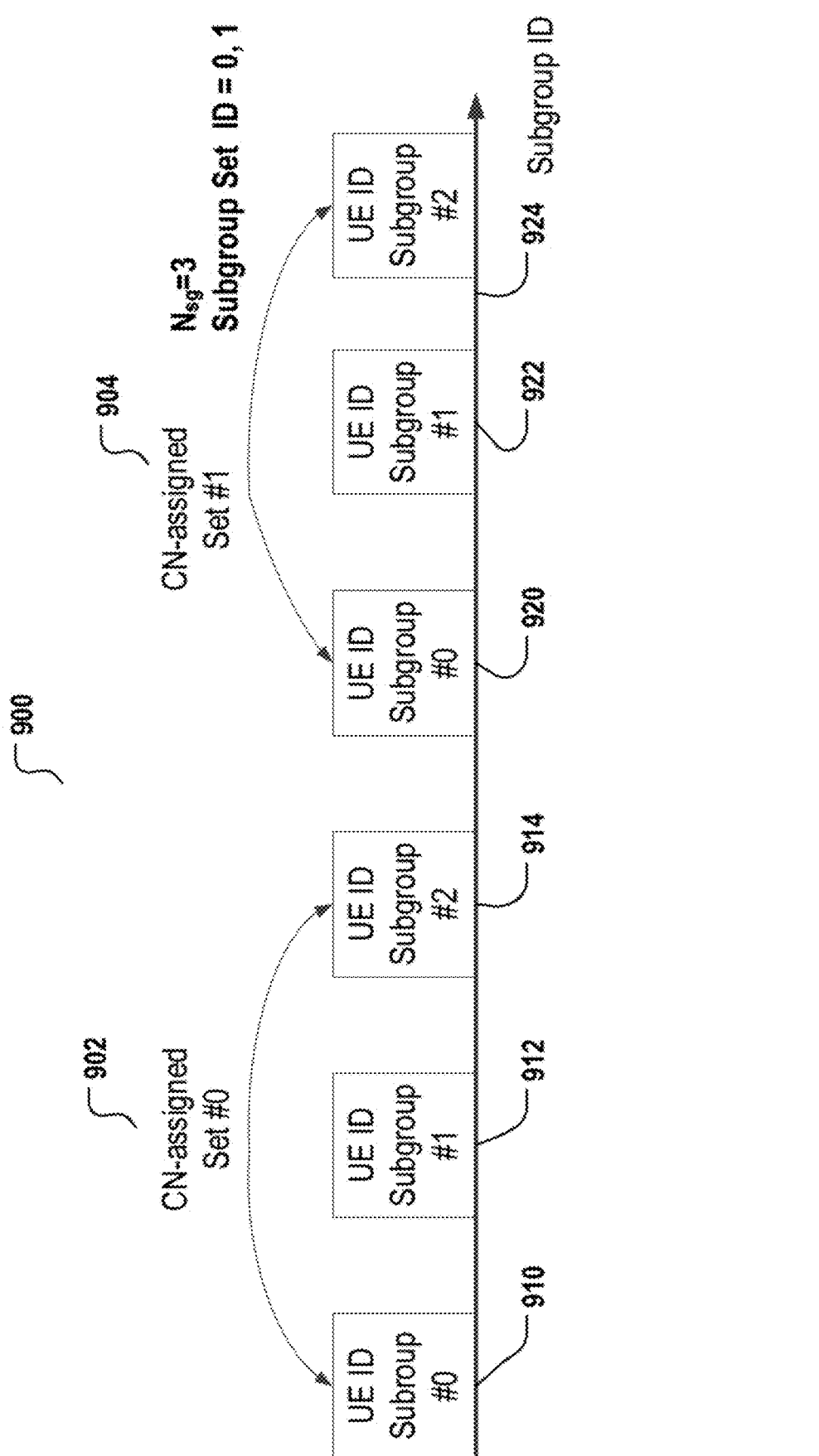
FIG. 9 illustrates an example two-level paging grouping scheme.

In a first example two-level subgrouping scheme and for a RAN, the subgroup set ID of a subgroup ID data structure of a UE may be directly assigned by CN whereas the subgroup ID of the subgroup ID data structure of the UE may be calculated using the UE ID, as illustrated in FIG. 9.

The subgroup ID data of the subgroup ID data structure, for example, may be derived as follow:

$$\text{Subgroup ID} = \text{mod}(\text{floor}(\text{UE\_ID}/(N^*N_S)), N_{sg})$$

The CN assignment of the subgroup set ID data items is shown as 902 and 904 for subgroup set #0 and subgroup set #1 in FIG. 9. While FIG. 9 merely illustrates two subgroup sets, an actual implementation is not so limited. There may be any number of subgroup sets as assigned by the CN in this scheme. The subgroup ID data items within the subgroup ID set #0 is shown as 910, 912, and 914 in FIG. 9 whereas the subgroup ID data items within the subgroup ID set #1 is shown as 920, 922, and 924 in FIG. 9.

In this example implementation, for a particular UE, its subgroup ID data structure may contain either one or both of the subgroup ID data items above in the following manner The subgroup ID data structure of a UE that supports UE ID-based subgrouping and that is not provided with a CN assigned subgroup set ID may only contain the UE ID-based subgroup ID data item as determined following the equation above.

The subgroup ID data structure of a UE that is assigned with a subgroup set ID by a CN and that also supports UE ID-based subgrouping may contain both the subgroup set ID assigned by the CN and the subgroup ID data item obtained following the equation above.

The subgroup ID data structure of a UE that is assigned with subgroup set ID by a CN but does not support UE ID-based subgrouping may only include the subgroup set ID assigned by the CN.

Second Example Two-Level Subgrouping

Figure 10:
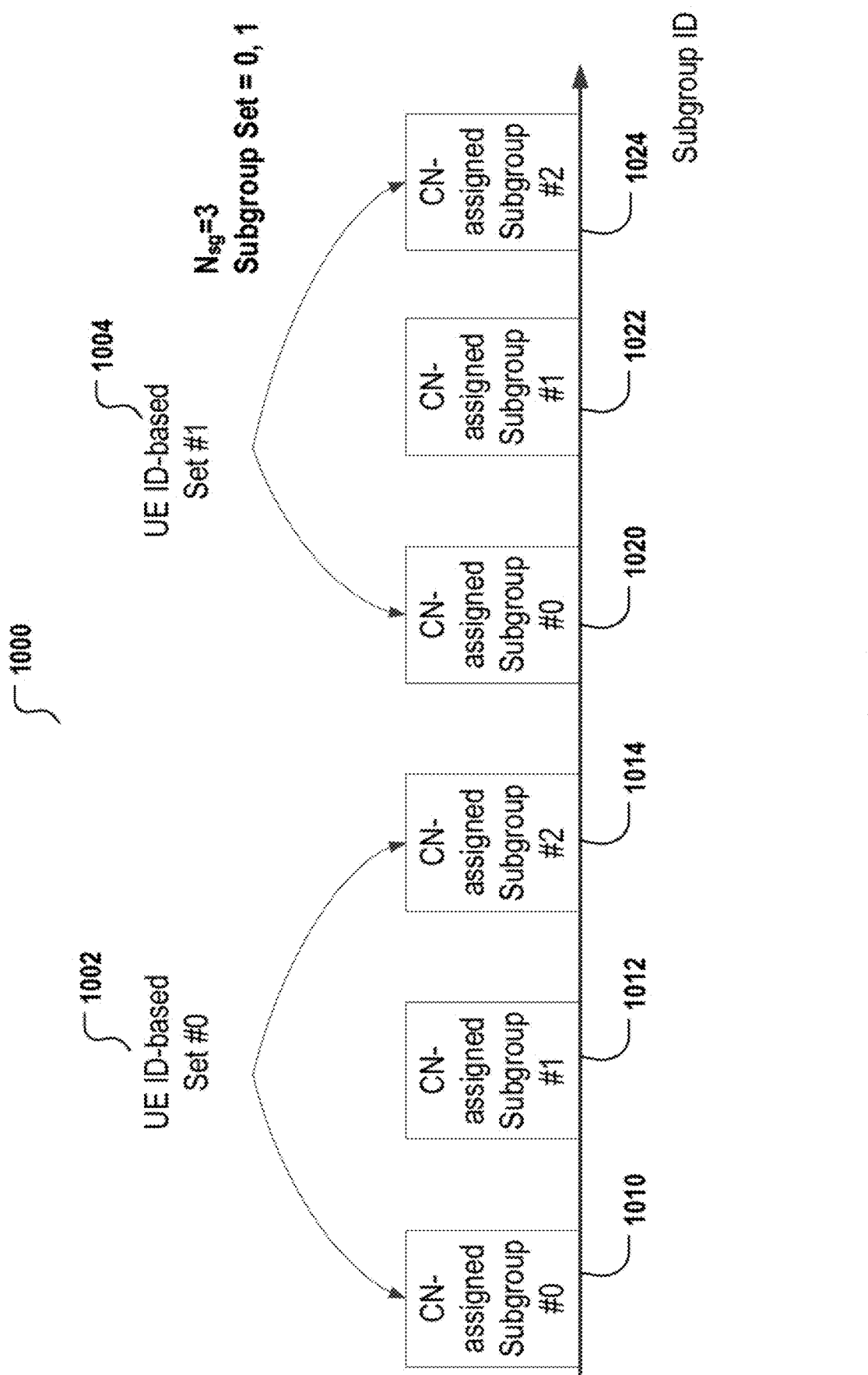
FIG. 10 illustrates another example two-level paging grouping scheme.

In a second example two-level subgrouping scheme and for a RAN, the subgroup set ID of a subgroup ID data structure of a UE may be derived from the UE ID whereas the subgroup ID of the subgroup ID data structure of the UE may be assigned by and obtained from the CN, as illustrated in FIG. 10. The subgroup set ID, for example, may be calculated as:

$$\text{Subgroup set ID} = \text{mod}(\text{floor}(\text{UE\_ID}/(N^*N_S)), N_{sg}).$$

The subgroup set ID data items that may be calculated following the equation above are illustrated as 1002 and 1004 for subgroup set #0 and subgroup set #1 in FIG. 10. While FIG. 10 merely illustrates two subgroup sets, an actual implementation is not so limited. There may be any number of subgroup sets as supported by the RAN (such as $N_{sg}$). The subgroup ID data items as assigned by the CN within the subgroup ID set #0 is shown as 1010, 1012, and 1014 in FIG. 10 whereas the subgroup ID data items within the subgroup ID set #1 is shown as 1020, 1022, and 1024 in FIG. 10.

In this example implementation, for a particular UE, its subgroup ID data structure may contain either one or both of the subgroup ID data items above in the following manner The subgroup ID data structure of a UE that supports UE ID-based subgrouping and/or that is not provided with a CN assigned subgroup set ID may only contain the UE ID-based subgroup set ID as determined using the equation above.

The subgroup ID data structure of a UE assigned with subgroup ID by a CN and also support UE ID-based subgrouping may contain both and the subgroup ID assigned by the CN and the subgroup set ID as determined using the equation above.

The subgroup ID data structure of a UE that is assigned with subgroup ID by a CN but that does not support UE ID-based subgrouping may only contain the subgroup ID as assigned by the CN.

Signaling

Returning to the logic flow 600 of FIG. 6 and in step 602, the subgrouping strategy and subgroup information broadcasted or transmitted by from the network side, in some example implementations, may be carried via system information block, including one or more of the following fields or data items.

For example, the system information block may include a first flag that may be enabled to explicitly indicate that the UE ID-based subgrouping is available for the serving cell. The first flag and other supplemental information items in the system information block may include one or more of:

$N_{sg}$: the maximum number of UE ID-based paging subgroups supported in the serving cell.

$N_{sg}$ set: the maximum number of UE ID-based paging subgroup sets supported in the serving cell.

UEIDPagingSubgrouping: to indicate whether the serving cell support UE ID-based subgrouping or not.

DCIFormat: a DCI format which indicates to support UE ID-based subgrouping

For another example, the system information block may include a second flag that may be enabled to explicitly indicate that CN-assigned subgrouping is available for the serving cell. The second flag and other supplemental information items in the system information block may include one or more of:

SupportCNassignedSubgroup: to indicate whether the serving cell support the CN-assigned subgrouping or not.

Ncn: the maximum number of CN-assigned paging subgroups supported in the serving cell.

Ncn_set: the maximum number of UE ID-based paging subgroup sets supported in the serving cell.

DCIFormat: a DCI format which indicates to support CN-assigned subgrouping

For another example, the system information block may include some indications that may be enabled to implicitly indicate that CN-assigned subgrouping is available for the serving cell. In some implementations, if $N_{max} - N_{sg}$ is greater than zero, it means that the CN-assigned subgrouping is supported, and the value of $(N_{max} - N_{sg})$ represents the total number of CN-assigned subgroups.

In some implementations, the access network may be implemented as a combination of central and distributed unit system (i.e., CU-DU split) communicating via an F1 interface. For generating the paging information, signaling between a DU and CU with respect to paging subgroup information before a PO may be performed. Such signaling information, for example, may include one or more of the subgroup ID information, subgroup set ID information, and/or subgroup ID offset value (CN-assigned).

The description and accompanying drawings above provide specific example embodiments and implementations.

The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method performed by a wireless terminal device, comprising:
   receiving paging subgroup configuration information from a wireless network;
   determining a paging subgroup identifier based on the paging subgroup configuration information; and
   determining whether to wake up to monitor a paging occasion based on whether the paging subgroup identifier corresponding to the paging occasion is indicated in a Downlink Control Information (DCI) message prior to an arrival of the paging occasion,
   wherein the paging subgroup identifier indicates either a paging subgroup among a first type of paging subgroups or another paging subgroup among a second type of paging subgroups;
   wherein first paging subgroup identifiers corresponding to the first type of paging subgroups are assigned by a core network and second paging subgroup identifiers corresponding to the second type of paging subgroups are generated based on a UE identifier (UE ID); and
   wherein the first paging subgroup identifiers and the second paging subgroup identifiers are sequentially numbered with the second paging subgroup identifiers being greater than the first paging subgroup identifiers.

2. The method of claim 1, wherein the second paging subgroup identifiers are generated further based on a number of total paging frames in a DRX paging cycle, a predefined number of paging occasions (POs) in a paging frame, a number of the second type of paging subgroups and a number of the first type of paging subgroups.

3. The method of claim 2, wherein the second paging subgroup identifiers are generated according to mod (floor $(UE\_ID/(N^*N_s))$, $N_{sg}$)+$N_{CN}$,
   wherein:
   UE_ID is the UE identifier;
   N is the number of total paging frames in a DRX paging cycle;
   $N_s$ is the predefined number of paging occasions (POs) in a paging frame;
   $N_{sg}$ is the number of the second type of paging subgroups; and
   $N_{CN}$ is the number of the first type of paging subgroups.

4. The method of claim 2, wherein the paging subgroup configuration information is received via a system information block and comprises at least the number of the second type of paging subgroups.

5. The method of claim 1, wherein a total number of the first type of paging subgroups and the second type of paging subgroups is $N_{max}$, a total number of the first type of paging subgroups is $N_{CN}$, a total number of the second type of paging subgroups is $N_{sg}$, and wherein $N_{CN}=N_{max}-N_{sg}$.

6. The method of claim 5 further comprises:
   determining, by the wireless terminal device, that the first type of paging subgroups is available in response to $N_{max}-N_{sg}$ being greater than zero.

7. The method of claim 1, wherein:
   the DCI message comprises a bitmap;
   each bit of the bitmap corresponds to a paging subgroup; and
   a bit corresponding to a paging subgroup identifier of the wireless terminal device with a value set as 1 indicates that the wireless terminal device is to wake up to monitor the paging occasion.

8. A method performed by a wireless terminal device, comprising:
   receiving paging subgroup configuration information from a wireless network;

determining a paging subgroup identifier based on the paging subgroup configuration information; and determining whether to wake up to monitor a paging occasion based on whether the paging subgroup identifier corresponding to the paging occasion is indicated in a Downlink Control Information (DCI) message prior to an arrival of the paging occasion, wherein the paging subgroup identifier indicates either a paging subgroup among a first type of paging subgroups or another paging subgroup among a second type of paging subgroups;

wherein first paging subgroup identifiers corresponding to the first type of paging subgroups are assigned by a core network and second paging subgroup identifiers corresponding to the second type of paging subgroups are generated based on a UE identifier (UE ID) according to mod (floor $(UE\_ID/(N*N_s))$, $N_{sg})+N_{CN}$, wherein:

UE_ID is the UE identifier;

N is a number of total paging frames in a DRX paging cycle;

$N_s$ is a predefined number of paging occasions (POs) in a paging frame;

$N_{sg}$ is a number of the second type of paging subgroups; and $N_{CN}$ is a number of the first type of paging subgroups.

9. The method of claim 8, wherein a total number of the first type of paging subgroups and the second type of paging subgroups is $N_{max}$, a total number of the first type of paging subgroups is $N_{CN}$, a total number of the second type of paging subgroups is $N_{sg}$, and wherein $N_{CN}=N_{max}-N_{sg}$.

10. The method of claim 9 further comprises:

determining, by the wireless terminal device, that the first type of paging subgroups is available in response to $N_{max}-N_{sg}$ being greater than zero.

11. The method of claim 8, wherein the paging subgroup configuration information is received via a system information block and comprises at least the number of the second type of paging subgroups.

12. The method of claim 8, wherein the DCI message comprises a bitmap, each bit of the bitmap corresponds to a paging subgroup, and a bit corresponding to a paging subgroup identifier of the wireless terminal device with a value set as 1 indicates that the wireless terminal device to wake up to monitor the paging occasion.

13. A wireless terminal device, comprising a memory for storing instructions and at least one processor configured to execute the instructions to perform the method of claim 8.

14. A wireless terminal device, comprising a memory for storing instructions and at least one processor configured to execute the instructions to:

receive paging subgroup configuration information from a wireless network;

determine a paging subgroup identifier based on the paging subgroup configuration information; and determine whether to wake up to monitor a paging occasion based on whether the paging subgroup identifier corresponding to the paging occasion is indicated in a Downlink Control Information (DCI) message prior to an arrival of the paging occasion, wherein the paging subgroup identifier indicates either a paging subgroup among a first type of paging subgroups or another paging subgroup among a second type of paging subgroups;

wherein first paging subgroup identifiers corresponding to the first type of paging subgroups are assigned by a core network and second paging subgroup identifiers corresponding to the second type of paging subgroups are generated based on a UE identifier (UE ID); and wherein the first paging subgroup identifiers and the second paging subgroup identifiers are sequentially numbered with the second paging subgroup identifiers being greater than the first paging subgroup identifiers.

15. The wireless terminal device of claim 14, wherein the second paging subgroup identifiers are generated further based on a number of total paging frames in a DRX paging cycle, a predefined number of paging occasions (POs) in a paging frame, a number of the second type of paging subgroups and a number of the first type of paging subgroups.

16. The wireless terminal device of claim 15, wherein the second paging subgroup identifiers are generated according to mod (floor $(UE\_ID/(N*N_s))$, $N_{sg})+N_{CN}$, wherein:

UE_ID is the UE identifier;

N is the number of total paging frames in a DRX paging cycle;

$N_s$ is the predefined number of paging occasions (POs) in a paging frame;

$N_{sg}$ is the number of the second type of paging subgroups; and $N_{CN}$ is the number of the first type of paging subgroups.

17. The wireless terminal device of claim 15, wherein the paging subgroup configuration information is received via a system information block and comprises at least the number of the second type of paging subgroups.

18. The wireless terminal device of claim 14, wherein a total number of the first type of paging subgroups and the second type of paging subgroups is $N_{max}$, a total number of the first type of paging subgroups is $N_{CN}$, a total number of the second type of paging subgroups is $N_{sg}$, and wherein $N_{CN}=N_{max}-N_{sg}$.

19. The wireless terminal device of claim 18 further comprises:

determining, by the wireless terminal device, that the first type of paging subgroups is available in response to $N_{max}-N_{sg}$ being greater than zero.

20. The wireless terminal device of claim 14, wherein:

the DCI message comprises a bitmap;

each bit of the bitmap corresponds to a paging subgroup; and a bit corresponding to a paging subgroup identifier of the wireless terminal device with a value set as 1 indicates that the wireless terminal device is to wake up to monitor the paging occasion.

* * * * *